Figure 1:
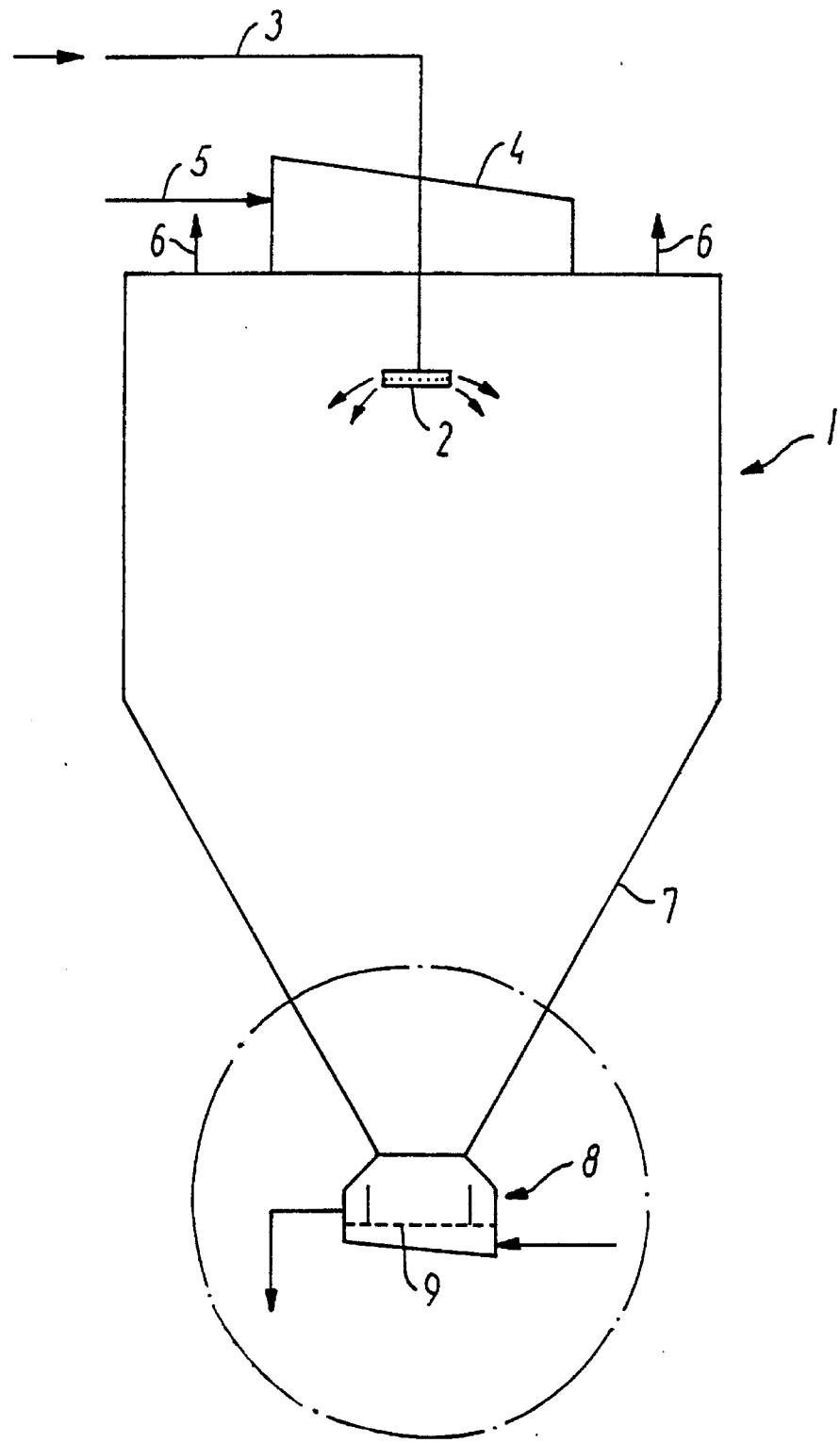

United States Patent [19]
Funder

[11] Patent Number: 5,615,493
[45] Date of Patent: Apr. 1, 1997

[54] SPRAY DRYING DEVICE

[75] Inventor: Christian R. Funder, Fredensborg, Denmark

[73] Assignee: Niro Holding A/S/, Soborg, Denmark

[21] Appl. No.: 619,567
[22] PCT Filed: Mar. 11, 1994
[86] PCT No.: PCT/DK94/00106
    § 371 Date: Mar. 29, 1996
    § 102(e) Date: Mar. 29, 1996
[87] PCT Pub. No.: WO95/24599
    PCT Pub. Date: Sep. 14, 1995
[51] Int. Cl.⁶ .................................... F26B 17/00
[52] U.S. Cl. ................................ 34/583; 34/168
[58] Field of Search ........................ 34/316, 362, 364, 34/366, 370, 372, 373, 168, 583, 594, 586; 110/245

[56] References Cited

U.S. PATENT DOCUMENTS

| | | | |
|---|---|---|---|
| 3,771,237 | 11/1973 | Hansen et al. | 34/586 |
| 4,107,851 | 8/1978 | Takacs et al. | 34/10 |
| 4,253,824 | 3/1981 | Foote | 34/583 X |
| 4,294,020 | 10/1981 | Evans | 34/168 |
| 4,490,403 | 12/1984 | Pisecky et al. | 426/453 |
| 4,497,691 | 2/1985 | Thubeaville | 34/168 X |
| 5,044,093 | 9/1991 | Itoh et al. | 34/585 |
| 5,555,636 | 9/1996 | Kramer et al. | 34/168 X |

FOREIGN PATENT DOCUMENTS 0474949  3/1992  European Pat. Off.

*Primary Examiner*—John M. Sollecito
*Assistant Examiner*—Steve Gravini
*Attorney, Agent, or Firm*—Sughrue, Mion, Zinn, Macpeak & Seas

[57] ABSTRACT

In a spray drying device with a drying chamber and at the bottom thereof a fluidized bed, which is maintained on a perforated plated, the fluidized layer is divided by means of separation means into two zones, of which only one is supplied with particles from the spray drying chamber, whereas the second zone is substantially supplied with particles only from the first zone and is designed for treatment of the particles while they pass through the zone in a flow without substantial back mixing. The device makes it possible to manufacture a product which without after-treatment, is substantially dustless and has the desired particle size distribution, degree of dampness and surface treatment. Furthermore, an improved exploitation of energy is achieved.

20 Claims, 3 Drawing Sheets

SPRAY DRYING DEVICE

The invention relates to a spray drying device comprising a drying chamber with at least one fluid spraying means and means for introducing drying air into the chamber as a flow around the spraying means, said drying chamber having a conically downwards tapering section and at the bottom a perforated plate and means for producing an upwardly directed air flow through the perforations of the plate for maintaining a fluidized particle layer on top of the plate.

For spray drying of many different kinds of products a particular interest has for the last decade been taken in spray drying devices of the above type, i.e. apparatuses, in which initially a drying of the sprayed drops of liquid takes place in a drying chamber like in the more conventional spray drying plants, following which the particles thus formed, while still having a considerable moisture content, are received in a fluidized bed which is maintained in the bottom part of the apparatus. In this fluidized bed an after-drying of the moist particles takes place and possibly an agglomeration thereof. Moreover, the too fine particles are blown off to a certain degree and transferred to the spraying chamber for agglomeration in such a way that a product is recovered from the fluidized bed with better particle size distribution than obtainable with a conventional spray drying device without a fluidized bed.

To this may be added a large number of additional advantages which all after the circumstances may be just as important or more important than the particle size distribution. Examples of these other advantages may be a particularly good energy economy, a very compact construction relative to the capacity and a gentle handling of the material to be dried, which is particularly important in connection with heat-sensitive materials.

A more detailed description of this type of spray drying apparatuses is disclosed in published Danish patent application no. 2670/82 and the corresponding patents EP 97484 and U.S. Pat. No. 4,490,403 as well as in French patent no. 1 526 478.

An essential function of the fluidized bed at the bottom of spray drying devices of the type in question is to catch the relatively moist particles from the actual spray drying process, and for that purpose a bigger height of the fluidized layer is required than what is optimal for the dust-removing effect, as the big height of the layer prevents an effective blowing off of fine particles from the lower parts of the layer. To this may be added that on account of the fact that the whole surface of the layer is constantly receiving moist particles from the spray drying zone, the layer consists of particles which have had a widely differing staying time in the layer and which are therefore inhomogeneous in respect of moisture content, and the product removed from the fluidized bed will therefore usually have a higher moisture content than what is desirable in the end product.

It is therefore usual to supplement the known spray drying apparatuses of the type described with an additional classification and/or after-drying device, for instance a vibrating or stationary fluidized bed or a vertical wind classification plant.

If the product is to receive an after-treatment which comprises the spraying on of liquid and a subsequent drying, for instance in view of coating or surface modification, it is a prerequisite according to prior art to use a special after-treatment device therefor, in which a spraying on of liquid takes place in a fluidized bed or for instance in a drum.

Such after-treatment devices with accompanying plants for collecting the fine particles carried along by the outgoing air, such as cyclones, electro filters, filter bags or washing towers, are space demanding, complicated to operate and cost demanding.

The requirements to the quality of the spray dried powders in respect of freedom from dust, agglomeration degree and particle size distribution are constantly increasing. The increased attention to allergic phenomena and work environmental conditions as a whole, both during production of powders and during their later use, have had the effect that near-by dustlessness is today a basic requirement to powdery material within many technological areas.

Concurrently the requirements to the functional properties of powdery materials have been made more stringent. Specific requirements are made to the humidifying and re-solubility speed or re-dispersion ability of the powders, their mechanical stability, compressibility and more specific properties like for instance the capability of a controlled liberation of active components. To meet such requirements it is to an increasing extent necessary with a subsequent treatment of spray dried powders by agglomeration, granulation, coating or the like.

These more stringent requirements as to quality entail that a constantly increasing share of the industrial spray drying processes have to be carried out in plants comprising several treatment units as described above.

As explained above there are, however, considerable drawbacks in plants which in addition to a spray drying device with an integrated fluidized bed comprise an after-treatment unit for after-drying, dust removal, coating or the like.

It is, therefore, the object of the invention to provide a spray drying device which constitutes a single compact unit and which can directly produce a powdery product meeting the quality requirements which can otherwise only be met by use of conventional spray drying devices with integrated fluidized bed if an after-treatment plant of the above-mentioned type is connected therewith.

The object is meet by a spray drying device of the type described in the first paragraph of the present description, said device being characteristic in that the fluidized particle layer is divided by separation means into at least two zones comprising a first zone, in which moist particles created in the drying chamber are absorbed, said first zone being adapted to full and permanent particle mixing, and a second zone which is shielded from the drying chamber such that it is not supplied directly therefrom and which is connected with means for introducing particles therein from said first zone and with means for removal of particles from said second zone, said means for introducing particles and said means for removal of particles being mutually arranged in such a way that the particles pass the second zone without substantial backmixing.

By thus dividing the fluidized particle layer conditions may be maintained in the first zone substantially corresponding to the conditions in the fluidized particle layer at the bottom of the conventional spray drying devices with integrated fluidized bed, i.e. with a relative high particle layer, in which a constant mixing takes place of the particles reaching the layer from the spraying chamber with the particles already present in the layer, the average particle humidity, however, being maintainable somewhat higher than is the case in the conventional plants. In said second zone particles are not supplied directly from the spraying chamber, and in this zone, therefore, a so-called plug flow can be maintained without substantial backmixing of the powder, such that all particles have substantially the same staying time and consequently receive a homogenous treatment. This treatment may typically be an after-drying, but also a coating or a corresponding treatment consisting in spraying on of liquid and subsequent drying. In the second zone the height of the fluidized layer may be kept so low that an effective blowing away of fine particles, i.e. dedusting, takes place.

A particular aspect of the invention is that a bigger part of the evaporation of water during the drying may be removed from the spray drying zone to the fluidized layer than what is possible in conventional plants with integrated fluidized layer. This is due to the fact that the after-drying, which may be carried out in the second one of the zones of the fluidized layer, makes it possible to operate the device during such conditions that the spray dried particles can be received in the fluidized layer with a bigger water content than what is possible with conventional apparatuses. As drying in a fluidized layer, as known to the one skilled in the art, is more economic as to energy consumption than spray drying, the device according to the invention thus makes an improvement of the overall energy economy possible.

The practical separation of the two zones and the prevention of the humid particles coming from the drying chamber from substantially only reaching the first of the zones may be established in various ways, as will be seen from the sub-claims, and is described in connection with the description of the drawing following below.

In the drawing

Figure 2:
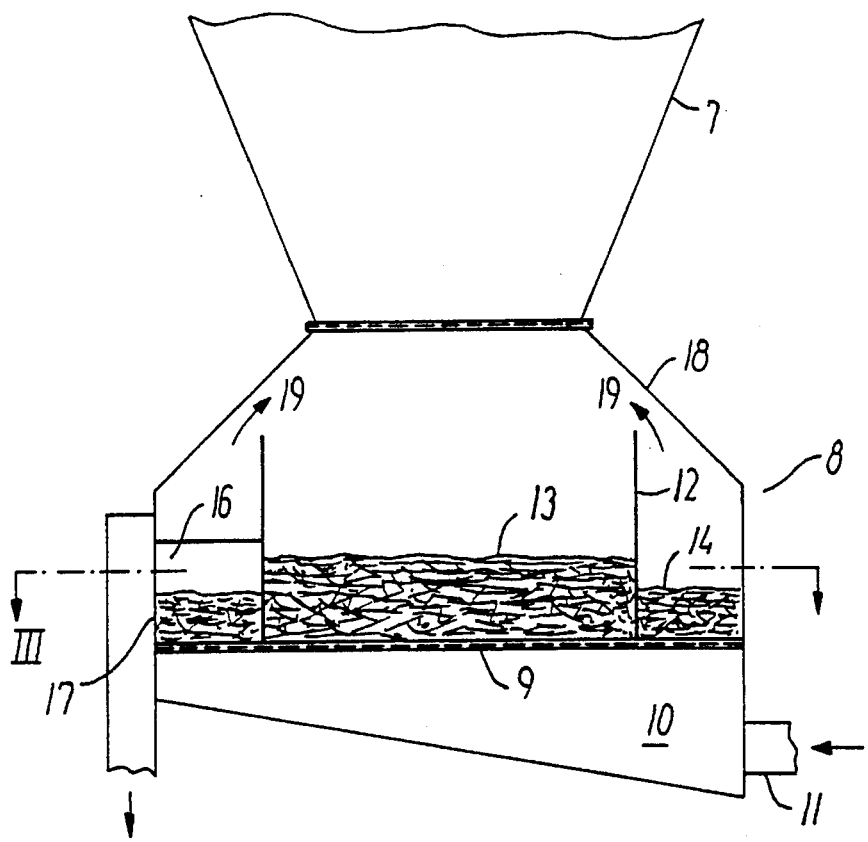
Figure 3:
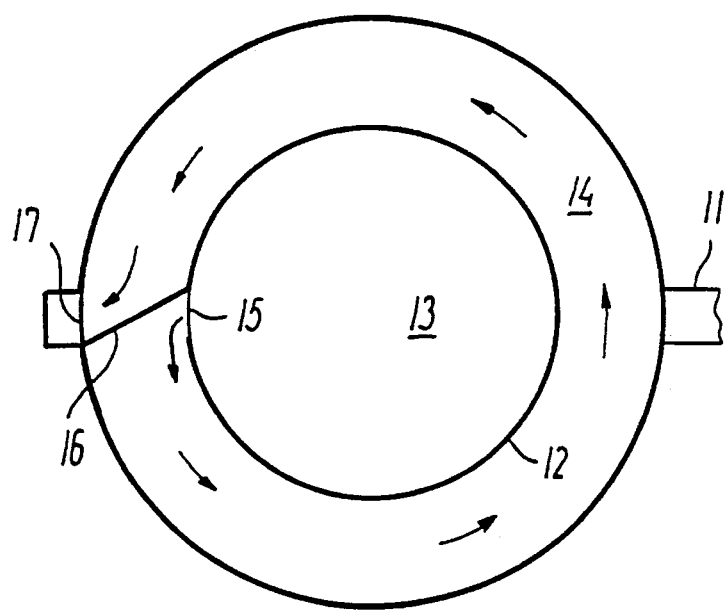
Figure 4:
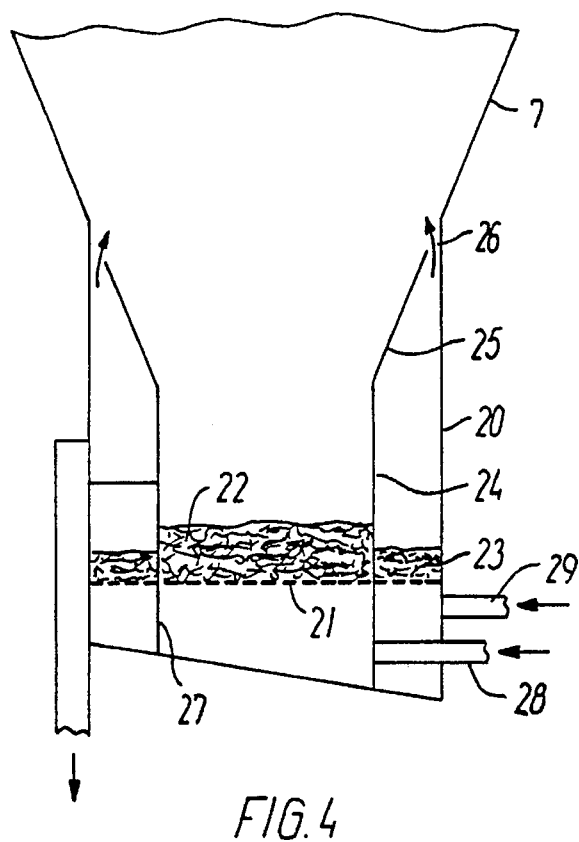
Figure 5:
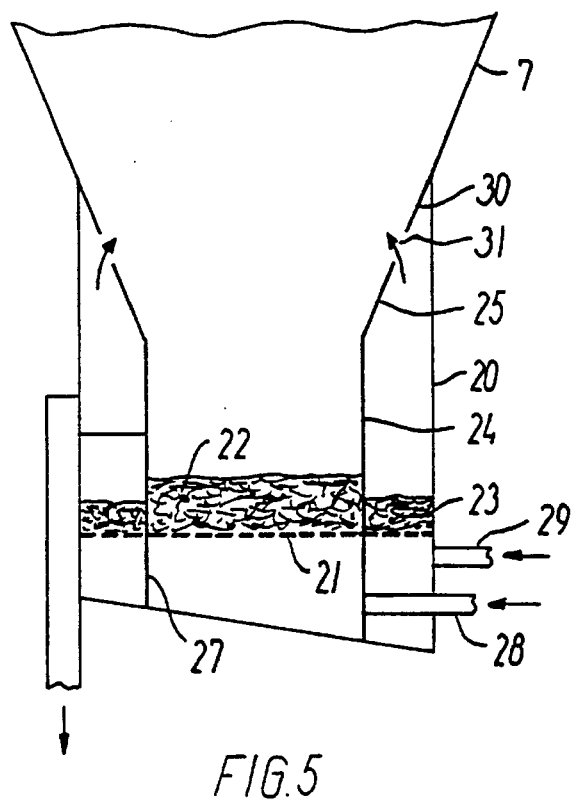

FIG. 1 is a schematic embodiment of a spray drying device according to the invention, FIG. 2 an enlarged schematic sectional reproduction of the part of the device encircled by the dot-and-dash circle in FIG. 1, FIG. 3 a schematic view in the plane III—III in FIG. 2, seen from above, and FIG. 4 another embodiment of the part encircled by the dot-and-dash line in FIG. 1, and FIG. 5 an additional embodiment of said part.

In FIG. 1 reference numeral 1 designates a drying chamber with a liquid spraying means 2, which in the embodiment shown is a rotating spraying wheel, but which might just as well be one or more nozzles. Through a feeding conduct 3 the spraying means is supplied with the solution or suspension to be dried.

At the top of the chamber means 4 are present in form of an air distributor receiving the primary drying air through a feeding conduct 5.

In the present description and claims the term drying air is used in a broad sense comprising any medium which is gaseous and has drying capacity at the temperatures in question. The term is thus not confined to atmospheric air.

From 4 drying air is introduced into the chamber 1 as a flow around the spraying means 2 in an upward direction, preferably in such a way that the drying air initially follows a helical path.

From the spraying means 2 drops of the liquid to be dried are carried along by the flow of drying air coming from 4, whereby an essential part of the liquid phase of the drops evaporates for the formation of humid particles which are taken downwards in the chamber by the flow of drying air.

In a typical embodiment like the one illustrated in FIG. 1, the drying air supplied from the means 4 forms a central, downwards directed flow which, before it reaches the bottom of the chamber, bends outwards and runs vertically along the periphery of the drying chamber and leaves it in the upper part of the chamber through outlets 6 near the periphery of the chamber.

The drying chamber has a conically downwards tapering section 7 which is at the bottom connected with a fluidizing chamber 8, the construction of which appears more clearly from FIGS. 2 and 3.

In the fluidizing chamber a substantially horizontal perforated plate 9 is provided which serves as air distributor and makes it possible to maintain a fluidized layer of powdery articles on top of the plate.

The plate 9 may in a manner known per se be provided with perforations distributed in a particular way, particular dimensions and directions for controlling the movement of the fluidized powdery layer present above the plate during operation.

Below the perforated plate 9 a plenum chamber 10 is provided in accordance with the embodiment shown in FIGS. 1, 2, and 3, said chamber receiving drying air through feeding conduct 11 and supplying the perforated plate with the amount of air necessary for obtaining the desired fluidization.

In the embodiment shown in FIGS. 1, 2, and 3 of the device according to the invention the perforated plate is circular, and it is important that its diameter is bigger than the lower part of the conical section 7 of the drying chamber and that it is positioned uniaxially below the conical section in the fluidizing chamber.

Immediately above the perforated plate 9 a circular cylindric vertical partition wall 12 is provided which on the perforated plate separates a first zone 13 from a second zone 14.

In the embodiment shown in FIGS. 1, 2, and 3 the diameter of the circular cylindric partition wall 12 and consequently of said first zone 13 is bigger than the lower diameter of the conical section 7 of the drying chamber.

When the device is operated particles are formed by the drying of the drops supplied from the spraying means 2, said particles reaching for a major part the fluidizing chamber 8 either directly or after being deposited on the oblique walls of the section 7, from where they slide down into the fluidizing chamber. Here these particles are received in the first zone 13, in which a relatively high layer of fluidized particles is maintained.

In this first zone the particles can on account of the relatively big height of the fluidized layer be received with a considerable humidity content, which is desirable, and they can subsequently be dried with good energy economy.

The staying time of the particles in the first zone 1 is adjusted such that a desired drying is attained, powder being continuously or regularly supplied from the first zone to the second zone 14.

This transfer of particles from the first zone to the second zone may take place through an overflow slot 15 in the partition wall 12 with adjustable height above the perforated plate, but also other more technologically advanced systems for controlled transfer of particles may be considered.

The particles which are transferred through the overflow slot 15 or a similar means for controlled powder transfer, form a fluidized layer in said second zone, which in the embodiments shown in the drawing is circular and delimited by the wall of the fluidizing chamber 8 and by the cylindrical partition wall 12. Between the partition wall 12 and the wall in the fluidizing chamber 8 a further partition wall 16 is provided, which meets the partition wall 12 close to the overflow slot 15 arranged therein. Close to the place, where the partition wall 16 meets the wall of the fluidizing chamber, an outlet 17 (FIG. 3) is arranged, said outlet being provided with a means for controlled particle removal, which means may also for instance be an overflow slot.

The particles, which through 15 reach the second zone 14, will on account of the inherent tendency of fluidized particles to spread horizontally, perhaps supported by perforations orientated in a particular way in the part of the perforated plate 9 which is positioned below the zone 14, for instance perforations having the form of so-called gill slits, pass as an even flow through the zone 14 until they reaches the outlet 17, from where they are removed.

During the passage through the zone 14 it is a question of a marked plug flow without any substantial backmixing of the particles, which makes them stay for the same amount of time in the zone.

In the zone 14 so small a height of the fluidized bed may be maintained that a very effective blowing off of fine particles is attained and consequently a practically dustless product. Furthermore, (not shown) nozzles may be arranged in the zone 14, through which suitable liquid may be sprayed on in view of obtaining a further agglomeration or coating or another surface modification of the particles. In respect of the last-named treatments it is important that the flow of the zone 14 can be kept even and homogenous without substantial backmixing.

It is a prerequisite for the maintenance of these desired conditions in the second zone 14 that no significant amounts of particles fall down therein from the spray drying chamber 1.

This is according to the embodiment shown in FIGS. 1, 2, and 3 mainly obtained thereby that the diameter of the first zone 13 is bigger than or equal to the diameter of the lower, narrowest part of the conical section 7 of the drying chamber, such that the particles, which slide down the oblique walls of the section 7 or fall down without touching these walls, are received in the first zone 13.

To further limit the amount of particles which might get from the drying chamber directly to the second zone 14, the circular partition wall 12 may be extended upwards substantially above the height of the fluidized beds which it separates, and possibly so high that together with the oblique upper walls 18 of the fluidizing chamber it defines a relatively small annular passage 19, through which air leaving the second zone passes up into the drying chamber at such high speed that it prevents oppositely directed passage of particles from the drying chamber to the second zone 14.

This principle may also be used as the only measure to prevent particles from the drying chamber from being directly received in the second zone 14. This makes it possible, when desired, to make the second zone 14 larger at the expense of the first zone 13, relative to what is shown in FIG. 2.

The fine particles blown up from the second zone 14 and the air coming from there, are conveyed up through the passage 19, led symmetrically into the bottom part of the drying chamber, where they in a desirable way exert a powdering effect on the walls of the conical section 7 and meet moist particles, with which they are agglomerated for the attainment of a desired particle size.

The principle described above, viz. that the passage over the second zone is narrowed in order to obtain sufficient air speed for preventing particles from the drying chamber from entering, is also utilized in a somewhat different embodiment of the device according to the invention, which is illustrated in FIG. 4.

In this embodiment the fluidizing chamber is constituted by a tubular section 20, which is a cylindrical extension of the lower conical section 7 of the drying chamber. In this fluidizing chamber a circular perforated plate 21 with substantially the same diameter as the lower part of the conical section 7 is provided.

A first zone 22 is separated from a second zone 23 by a circular cylindric vertical partition wall 24, which above the fluidizing level forms an upwardly extending funnel 25, the upper edge of which together with the wall of the section 20 define a narrow passage 26, through which the outgoing air from the second zone with therein contained fine particles passes at such a speed in upward direction that particles coming from above cannot penetrate into the second zone 23.

The embodiment shown in FIG. 4 is particularly suited in connection with rebuilding of existing spray drying devices with integrated fluidized bed.

The part of the device shown in FIG. 2 is a variant closely related to the one shown in FIG. 4.

The references in FIG. 5 which are also found in FIG. 4 have the same meaning as stated in connection with the description of FIG. 4.

In the embodiment shown in FIG. 5 the oblique wall 7 of the drying chamber is extended downwards beyond the place, in which the wall 7 meets the wall 20. Between this extension 30 and the upper edge of the funnel-shaped part 25 a passage 31 is provided, through which air coming from the fluidized bed passes into the drying chamber at such a speed, that sinking of particles from the drying chamber to the fluidized bed 23 is effectively counteracted.

Irrespective of the embodiment of the device it might be desirable to have an independent control possibility in respect of amount and temperature of drying air or cooling air, which is led to the two zones.

In the embodiments shown in FIGS. 4 and 5 the chamber below the fluidized bed is for that purpose divided by a cylindrical wall 27, such that to the central part below the first zone drying air is supplied through a tube 28, whereas the second zone 23 is supplied through a tube 29.

As an alternative or supplement to such a division of the chamber positioned below the perforated plate, the perforated plate 9 or 21 may be constructed with differing degree of perforation below the two zones.

As explained above in connection with FIG. 1, the used drying and treating air which is partly constituted by the drying air supplied through 5, and partly by the drying and treating air introduced through 11 or 28 and 29, from the drying device through the outlets 6. With this air a considerable amount of fine particles is carried along, which by measures not shown are separated and possibly led back to the process. The amount of these fine particles may be considerable and their possible retransfer takes place in various ways and to different places, for instance by being blown in near the spraying means 2 or to central areas in the spraying chamber or to the fluidized layer in the first zone 13 or 22, which will be obvious to the one skilled in the art.

I claim:

1. A spray drying device comprising a drying chamber (1) with at least one fluid spraying means (2) and means (5) for introducing drying air into the chamber as a flow around the spraying means, said drying chamber having a conically downwards tapering section and at the bottom a perforated plate (9,21) and means for producing an upwardly directed air flow through the perforations of the plate for maintaining a fluidized particle layer on top of the plate, characterized in that the fluidized particle layer is divided by separation means (12,24) into at least two zones comprising a first zone (13,22), in which moist particles created in the drying chamber (1) are absorbed, said first zone being adapted to full and permanent particle mixing, and a second zone (14,23) which is shielded from the drying chamber (1) such that it is not supplied directly therefrom and which is connected with means (15) for introducing particles therein from said first zone (13,22) and with means (17) for removal of particles from said second zone, said means for introducing particles (15) and said means (17) for removal of particles being mutually arranged in such a way that the particles pass the second zone (14,23) without substantial backmixing.

2. A spray drying device according to claim 1, characterized in that the perforated plate (9) has a bigger area than the bottom part of the conical section (7) of the drying chamber (1) and is arranged in a fluidizing chamber (8) connected therewith with an upwardly tapering part (18) which is connected with the bottom part of the conical section of the drying chamber, and in having a substantially vertical separation means (12) immediately above the perforated plate (9), which on the plate separates a central area constituting the first zone (13), with an extension which is equal to or bigger than the area of the bottom part (7) of the conical section of the drying chamber, from an area constituting the second zone (14) and which surrounds the area constituting the first zone.

3. A spray drying device according to claim 1, characterized in that the perforated plate (9) is circular and has a bigger diameter than the bottom part of the conical section (7) of the drying chamber (1) and is placed uniaxially below the bottom part in the fluidizing chamber (8), and in that the first zone (13) which is circular is delimited towards the second zone (14) with a circular cylindric vertical partition wall (12) placed concentrically on the perforated plate, whereas the second zone (14) is positioned between the partition wall and the wall of the fluidizing chamber (8), the diameter of the first zone (13) being bigger or equal to the diameter of the bottom part of the conical section of the drying chamber, and said second zone (14) being provided with a vertical partition wall (16) which extends from said partition means (12) to the peripheral wall of the fluidizing chamber (8), a passage being provided close to one side of the partition wall (16) for fluidized particles from the circular first zone (13) to the annular second zone (14), and close to the opposite side of the partition wall (16) an outlet passage (17) is provided for removal of particles from the second zone (14) after they have passed in fluidized state therethrough in an annular path.

4. A spray drying device according to claim 1, characterized in that above the second zone (14) in a level above a level, in which the surface of the fluidized particle layer is present during the operation of the device, a shielding is provided which limits the passage (19) between the drying chamber (1) and the second zone (14) to such an extent that the gas flow ascending from the fluidized layer in the second zone during the operation of the device at this passage has an upward-going speed, which is sufficient for substantially preventing particles, which have been created in the drying chamber, from being brought down into the fluidized layer in the second zone (14).

5. A spray drying device according to claim 4, characterized in that the shielding is formed by an upper extension of the partition wall (12) which divides the two zones.

6. A spray drying device according to claim 1, in which the perforated plate (21) is circular and has substantially the same diameter as the bottom part of the conical section (7) of the drying chamber and is positioned in a tubular fluidizing chamber (20) below the conical section, characterized in that the first and the second zone (22 and 23) are divided by a circular cylindric vertical partition wall (24) which above the level of the fluidized layer forms an upwardly extending funnel (25), and the upper edge of which together with the tubular wall of the fluidizing chamber (20) defines a passage (26) between the drying chamber (1) and the second zone (23).

7. A spray drying device according to claim 1, in which the perforated plate (21) is circular and has substantially the same diameter as the bottom part of the conical section (7) of the drying chamber and is positioned in a tubular fluidizing chamber (20) below the conical section of the drying chamber, characterized in that the first and the second zones (22 and 23) are separated by a circular cylindric vertical partition wall (24), which above the level of the fluidizing layer forms an upwardly extending funnel (25), and the upper edge of which together with an extension (30) of the oblique wall, which forms the conical section (7) of the drying chamber, define a passage (31) between the drying chamber (1) and the second zone (23).

8. A spray drying device according to claim 1, characterized in that below the perforated plate (9) it is provided with a plenum chamber (10) which is connected to a source for supply of drying and fluidizing air, said plenum chamber supplying both the perforations leading to said first zone (13) and the perforations leading to said second zone (14) with drying and fluidizing air.

9. A spray drying device according to claim 1, characterized in that below the perforated plate (21) means (27,28,29) are provided for separate supply of drying and fluidizing air to the portion of the perforated plate which is positioned below the first zone (22) and to the portion of the perforated plate which is positioned below the second zone (23).

10. A spray drying device according to claim 1, characterized in that the passage (15) for fluidized particles from the first zone (13) to the second zone (14) is an overflow slot, the height of which above the perforated plate being adjustable.

11. A spray drying device according to claim 1, characterized in that the outlet passage (17) for removal of particles from the second zone is an overflow slot in the peripheral wall of the fluidizing chamber (8), the height of which above the perforated plate is adjustable.

12. A spray drying device according to claim 2, characterized in that the perforated plate (9) is circular and has a bigger diameter than the bottom part of the conical section (7) of the drying chamber (1) and is placed uniaxially below the bottom part in the fluidizing chamber (8), and in that the first zone (13) which is circular is delimited towards the second zone (14) with a circular cylindric vertical partition wall (12) placed concentrically on the perforated plate, whereas the second zone (14) is positioned between the partition wall and the wall of the fluidizing chamber (8), the diameter of the first zone (13) being bigger or equal to the diameter of the bottom part of the conical section of the drying chamber, and said second zone (14) being provided with a vertical partition wall (16) which extends from said partition means (12) to the peripheral wall of the fluidizing chamber (8), a passage being provided close to one side of the partition wall (16) for fluidized particles from the circular first zone (13) to the annular second zone (14), and close to the opposite side of the partition wall (16) an outlet passage (17) is provided for removal of particles from the second zone (14) after they have passed in fluidized state therethrough in an annular path.

13. A spray drying device according to claim 2, characterized in that above the second zone (14) in a level above a level, in which the surface of the fluidized particle layer is present during the operation of the device, a shielding is provided which limits the passage (19) between the drying chamber (1) and the second zone (14) to such an extent that the gas flow ascending from the fluidized layer in the second zone during the operation of the device at this passage has an upward-going speed, which is sufficient for substantially preventing particles, which have been created in the drying chamber, from being brought down into the fluidized layer in the second zone (14).

14. A spray drying device according to claim 3, characterized in that above the second zone (14) in a level above a level, in which the surface of the fluidized particle layer is present during the operation of the device, a shielding is provided which limits the passage (19) between the drying chamber (1) and the second zone (14) to such an extent that the gas flow ascending from the fluidized layer in the second zone during the operation of the device at this passage has an upward-going speed, which is sufficient for substantially preventing particles, which have been created in the drying chamber, from being brought down into the fluidized layer in the second zone (14).

15. A spray device according to claim 2, characterized in that below the perforated plate (9) it is provided with a plenum chamber (10) which is connected to a source for supply of drying and fluidizing air, said plenum chamber supplying both the perforations leading to said first zone (13) and the perforations leading to said second zone (14) with drying and fluidizing air.

16. A spray device according to claim 3, characterized in that below the perforated plate (9) it is provided with a plenum chamber (10) which is connected to a source for supply of drying and fluidizing air, said plenum chamber supplying both the perforations leading to said first zone (13) and the perforations leading to said second zone (14) with drying and fluidizing air.

17. A spray drying device according to claim 2, characterized in that below the perforated plate (21) means (27, 28, 29) are provided for separate supply of drying and fluidizing air to the portion of the perforated plate which is positioned below the first zone (22) and to the portion of the perforated plate which is positioned below the second zone (23).

18. A spray drying device according to claim 3, characterized in that below the perforated plate (21) means (27, 28, 29) are provided for separate supply of drying and fluidizing air to the portion of the perforated plate which is positioned below the first zone (22) and to the portion of the perforated plate which is positioned below the second zone (23).

19. A spray drying device according to claim 2, characterized in that the passage (15) for fluidized particles from the first zone (13) to the second zone (14) is an overflow slot, the height of which above the perforated plate being adjustable.

20. A spray drying device according to claim 3, characterized in that the passage (15) for fluidized particles from the first zone (13) to the second zone (14) is an overflow slot, the height of which above the perforated plate being adjustable.

* * * * *